May 30, 1939.  K. E. BEMIS  2,160,351
TOASTING MACHINE
Filed April 19, 1938
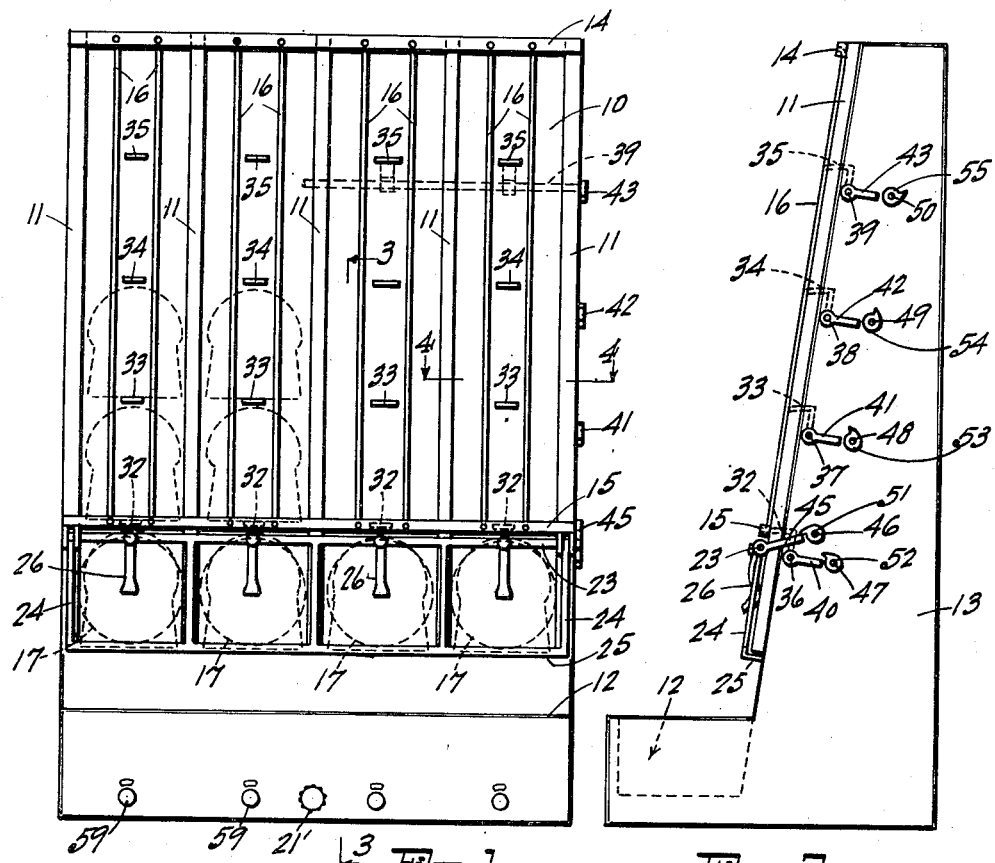
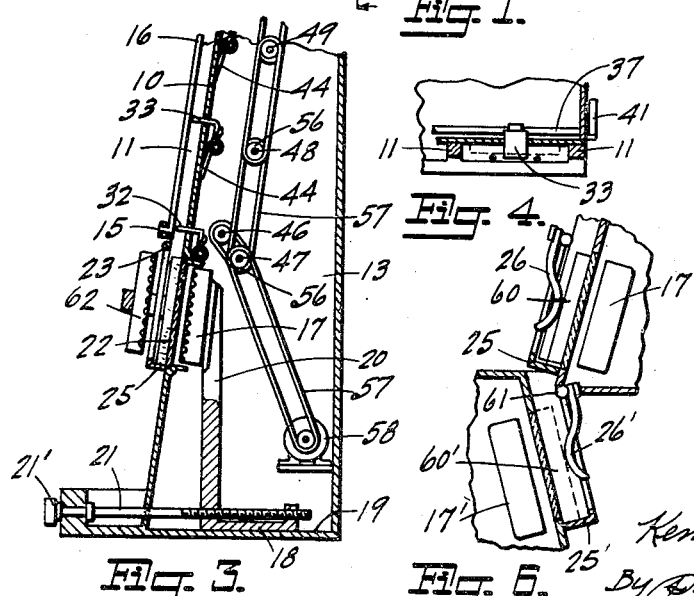
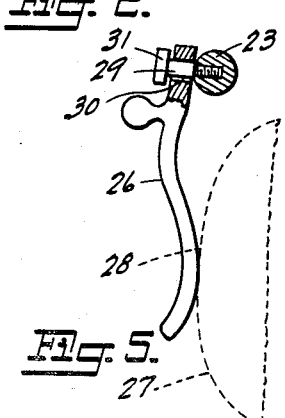
Inventor
Kenneth E. Bemis
By Philip A. Friedell
Attorney.

Patented May 30, 1939

2,160,351

UNITED STATES PATENT OFFICE 2,160,351

TOASTING MACHINE

Kenneth E. Bemis, Oakland, Calif.

Application April 19, 1938, Serial No. 202,909

20 Claims. (Cl. 53—5)

This invention, a toasting machine, is designed primarily for toasting half-buns on one side for making up the usual toasted sandwiches, and is also adaptable for toasting bread or other food products on both sides, and is automatic to the extent that no attention is required other than attending to the feeding of slices of bread or of the halved buns to the feeding mechanism; the feeding of the material to be toasted being automatically carried through without attention; the timing of the toasting period being exact and the discharge of the toasted material occurring simultaneously with completion of the toasting process.

The toasting of the material, especially for one side toasting, is preferably carried out by adjustment of the spacing between the heating unit and the material to be toasted, although the machine is adaptable for the commonly used method of changing the intensity of the source of heat.

The feeding mechanism is so designed that there can be no interlapping or step toasting of the food; that is, toasting cannot be started on one part of the food or slice of bread while another slice is toasting, as the next following slice cannot move into toasting position until the instant slice has been discharged from the toasting section.

The toaster can be constructed with one or more feeding sections, each of which will handle a continuous toasting and feeding operation of a series of slices of bread or buns, therefore providing for any desired capacity.

The toasting machine can be constructed to toast one side of the bread, or to toast both sides, either simultaneously or in sequence, according to the arrangement and relative location of the heating units.

In describing the invention, reference will be had to the accompanying drawing, in which:

Fig. 1 is a front elevation of the invention as constructed with four feeding and toasting sections, and adapted for toasting on one side only.

Fig. 2 is a side elevation of Fig. 1.

Fig. 3 is a fragmentary sectional view conforming to line 3—3 of Fig. 1, but modified for toasting both sides of a slice of bread simultaneously.

Fig. 4 is a fragmentary sectional view taken on line 4—4 of Fig. 1.

Fig. 5 is an enlarged view of one of the bun-urging fingers, for single side, or, two-side sequential toasting.

Fig. 6 is a fragmentary view showing two toasting sections in vertical series for two-side toasting in sequence.

The invention includes a frame having a face wall 10 which is slightly inclined backwardly forming a chute and which is provided with forwardly projecting side guides 11 extending throughout the height thereof and forming a plurality of feeding sections between the guides. A receiver 12 is provided at the lower end of the machine for receiving toast discharged following the toasting operation. End walls 13 provide mounting means for the operating mechanism and for the second toasting units for two-side simultaneous toasting operations. Cross-bars 14 and 15 are provided respectively at the top, and just above the toasting section for supporting the front guards 16, each toasting section including the space bounded by two side guides 11 and cross bar 15 and terminal support 25.

A heating unit 17 is provided for each toasting section and may be mounted for independent adjustment, or for simultaneous adjustment of all of the heating units relative to the front face wall 10, the adjusting means being shown as consisting of a base 18 slidably mounted on the bottom 19 of the frame, and having upwardly projecting arms 20 on which the respective heating units are mounted, the adjustment being carried out by means of a screw 21 which is provided with a knurled or other suitably finished knob 21', for manual adjustment at will.

A transparent, heat proof plate 22, made of mica, "Pyrex" glass or other suitable material is mounted in an opening formed in the front wall, flush with the face thereof, and forms a spacing means between the heating unit and the material to be toasted, and coincidently forms visual indicating means for observance of the operative condition of the heating unit and its spacing from the plate 22.

Thus, the bun or slice of bread to be toasted lies or reclines lightly against the front face of the plate 22, and the speed of toasting and degree thereof is dependent upon the distance the heating unit is spaced from the plate. This plate also reduces the amount of heat transferred to the wall 10, which obviously reduces the degree of drying of the bread during the feeding process.

Rotatably mounted in spaced relation forwardly of the front wall 10 is a shaft 23 to which depending fingers 24 are secured, and a terminal bread support or shelf 25 extends toward and normally cooperates with the front wall 10 and is supported by the fingers 24, and forms a support for the material to be toasted during the actual toasting process.

A holding finger 26 is freely supported for light gravitational cooperation with the back of the bun 27 as indicated at 28, one method of support being indicated in Fig. 5 in which a shouldered screw 29 fits freely in the hole 30 formed in the finger, with the space between the head 31 and support 23 greater than the thickness of the supported portion of the finger 26.

This finger has just sufficient off-balance reaction to just prevent the bun from tipping away from the plate 22, while creating but a very light urgence to keep the bun in contact with the plate.

Extending upwardly along each feeding section of the toaster is a series of spaced apart bread supports 32 to 35 which project through openings formed in the wall 10 and which are respectively attached to the respective shafts 36 to 39 which extend throughout the width of the machine back of the front plate 10, and these shafts respectively have affixed at one end outside the end wall of the cabinet the respective release fingers 40 to 43 which function for both, manual and mechanical retraction of the supports 32 to 35, and springs 44 normally keep the supports 32 to 35 in forwardly projected, bread catching and supporting position.

A release finger 45 is also provided for the shaft 23, and a series of control or actuating shafts 46 to 50 are mounted respectively in cooperative relation to the fingers 45 and 40 to 43, and cams 51 to 55 are mounted on these shafts in cooperative relation to the fingers 45 and 40 to 43 and are arranged to depress and release the fingers 45 and 40 to 43 once in each revolution. These cams are timed for sequential operation of the fingers, the shafts 46 to 50 all being driven in synchronism through sprockets 56 and chains 57 by a small motor 58 provided with a high gear ratio to reduce the operation of the shafts to a very low speed.

The operation of the invention is as follows: The switches 59 are provided for only one degree of heat. If the bread or bun is fresh and moist, the heating units 17 are adjusted close to the plate 22, this adjustment varying according to the condition of the material to be toasted and the degree of toasting desired.

By using a continuous or uninterrupted plate 22, crumbs are prevented from reaching the heating unit, which would cause smoke and odors.

After the heating units are properly heated, the motor 58 is started and a bun is dropped into the top of each feeding section, being stopped and supported by the supports 35. The finger release 43 is then manually depressed, retracting supports 35, thereby releasing the buns to drop to supports 34, this process of filling being continued until the machine is filled down to the supports 32.

As the shafts 46 to 50 rotate the cams 51 to 55, cam 52 first comes into action, depressing finger 40 and thereby retracting supports 32, releasing the buns supported thereby to drop down to the support 25.

Urging or holding fingers 26 hold the buns lightly in contact with the plate 22 and toasting of the bun is commenced.

As cam 52 releases the finger 40, supports 32 spring back to their original position to catch the next bun discharged from above, and immediately, cam 53 depresses finger 41, thereby retracting supports 33, releasing the next set of buns to drop down to the supports 32, the operation proceeding in this manner to the top set, at which time more buns can be introduced for the discharged top set.

After the supports 35 have returned to their projected position, cam 51 depresses finger 45, tipping support 25 outwardly from the front plate 10 while the holding fingers 26 permit the toasted buns to drop down into the receiver 12, and as the support 25 again drops back into supporting position, supports 32 are again retracted to release the next set of buns to drop to the toasting section for toasting.

This device can be used and constructed for toasting bread on both sides as is illustrated in Fig. 6, in which the bread 60, following discharge by the support 25, drops down onto a second support 25' to the position 60' in cooperative relation to an oppositely mounted heating unit 17', the shaft 61 being operated in proper sequence to shaft 23 so that the toast in the lower toasting section will be discharged and the support 25' returned to toast catching position before the toast in the upper toasting section is released for discharge to the lower toasting section, forming a two-stage toaster.

In Fig. 3, a second heating unit 62 is mounted in spaced relation to the heating unit 17, the bread dropping between the two units and being simultaneously toasted on both sides. In this case, the fingers 26 are omitted, the bread resting edgewise on the support 25 in the same manner as previously described, but being freely disposed between the heating units.

It will be understood that variations in construction and arrangement of parts, which variations are consistent with the appended claims, may be resorted to, without detracting from the spirit or scope of the invention, or sacrificing any of the advantages thereof.

I claim:

1. A toasting machine comprising; a series of substantially vertical chutes having each a face wall and a series of bread-supporting elements and a terminal bread support; a heating unit in heat-cooperative relation to the lower portion of each chute; and means retracting and projecting said bread supporting elements and said terminal bread support in sequential relation, whereby each support will be retracted to release and drop one slice of bread and immediately thereafter be projected to catch and support the next slice released and dropped from the next support above.

2. A structure as defined in claim 1, in which said supporting elements and terminal support include means manually operable at will for retraction thereof for manual feeding of the slices of bread.

3. A structure as defined in claim 1, in which the heating units are adjustable relative to the face of the chute to vary the intensity of the heat for toasting.

4. A toaster comprising; a feeding section having a face wall and terminating at its lower end in a toasting section, a heating unit mounted in cooperative relation to said face wall for said toasting section; support means supporting a series of slices of bread in slightly inclined spaced relation and including a terminal support for supporting the bread in toasting position; means operating said supports in sequential relation releasing and discharging one slice and catching and supporting the next slice discharged from a higher level.

5. A toaster as defined in claim 4; mounting means for said heating unit and adjusting means operable at will for adjusting said mounting means to space said heating unit relative to said face wall to change the degree of heat for toasting.

6. A toaster as defined in claim 4; and a second toasting section including a heating unit and a terminal support operated by the same means for sequential operation with the first-mentioned terminal support for toasting the other side of a slice of bread.

7. A toaster comprising; a feeding section terminating in a toasting section and having a slightly inclined face wall having side guides and a front guard; a series of retractable supports for supporting individual slices of bread in spaced, superposed relation along said inclined face wall throughout the length of the feeding and toasting sections; operating means retracting and projecting said supports in sequential relation to selectively release one slice of bread to drop to the next support or to discharge from the terminal support, and catch and support another slice of bread released in sequence by the next support above; and a heating unit in heat transfer relation to said face wall for the toasting section.

8. A toaster as defined in claim 7, an opening formed in said face wall in the toasting section, and a transparent, heat-proof plate mounted in said opening with its front face flush with said face wall, providing means for maintaining the spacing of the bread relative to the heating unit, as also for observance of operation of the heating unit and of said spacing.

9. A toaster as defined in claim 7; a mounting for said heating unit and means operable at will for adjusting said mounting to adjust the spacing of said heating unit relative to said face wall.

10. A structure as defined in claim 7; a second toasting section located below said first-named toasting section and in opposition thereto, and including a support operated in sequence with the other supports for receiving the slices of bread as discharged from the said first-named toasting section, for toasting the other side of the slices of bread.

11. A toaster comprising; a frame having a face wall backwardly inclined from the vertical and having side guides and front guards to form a chute; and consisting of an upper feeding section and a lower toasting section; a series of equally-spaced supports extending throughout the height of said face wall and including a terminal support at the lower end of said toasting section; operating means retracting said series of supports in sequential relation to release one slice of bread to drop to the next lower support and to discharge from the terminal support, and projecting said series of supports in sequential relation to catch and support the next slice of bread when sequentially released by the next support above, said operating means including means for manually retracting any of said supports at will; and a heating unit mounted in heat exchange relation to said face wall in the toasting section for toasting bread on one side; and means adjustable at will for changing the heat-exchange relation of said heating unit to said face wall.

12. A structure as claimed in claim 11; a second toasting section duplicating the first mentioned toasting section and oppositely disposed and located to gravitationally receive bread discharged from the said first mentioned toasting section, and including a terminal support operated sequentially with the first mentioned terminal support; said second toasting section toasting the bread on the other side.

13. A toaster comprising; a feeding section and a toasting section in vertical series; said feeding section gravitationally feeding a series of portions of food to said toasting section for toasting the portion on one side; a series of supporting elements for said feeding section for supporting said portions in spaced relation; a supporting element for said toasting section; operating means sequentially operating all of said supporting elements moving said supporting elements out of supporting position to release and discharge the portion supported by one supporting element and sequentially moving said supporting elements into supporting position to catch and support the portion released and discharged by the next supporting element above; said operating means including means manually operable for moving any of said supporting elements out of supporting position at will, to release the portions supported thereby; and a heating unit mounted for adjustment relative to said toasting section for varying the degree of heat transfer for heating the toasting section.

14. A toaster as defined in claim 13; said supporting element for the toasting section comprising a support normally in food-supporting relation and movable to non-supporting relation; said toaster section having a transparent heat-proof facing against which the food is to be urged during toasting, providing visual indication of the operative status of the heating unit and its position relative to said facing; and a finger gravitationally lightly urging the food against said facing and being substantially non-resistive to discharge or reception of the portions of food.

15. A toaster as defined in claim 13, a second toasting section mounted below said first named toasting section and oppositely disposed and frontally displaced therefrom to provide a passage for the portions discharged from the said first-named toasting section, and comprising a duplicate thereof including a supporting element operated in sequence with the other supporting elements, for toasting the portions on the other side.

16. A toaster comprising; a frame having a face slightly inclined backwardly from the vertical and including side guides and front guards, forming a chute for bread slices and terminating at its lower end in a toasting section; a series of supports spaced apart throughout the height of said chute and including means for independent manual retraction thereof at will; a support normally in position to support a slice in toasting position and including means for moving said support at will to discharge said slice; a finger gravitationally urging said slice into toasting position; and a heating unit in heat transfer relation for said toasting section, for toasting slices of bread on one side.

17. A toaster as defined in claim 16; a second toasting section located below said first named toasting section and comprising a duplicate thereof including a support and a finger, and being oppositely disposed and frontally spaced to form a passage for slices of bread discharged from the first named toasting section, for toasting the slices of bread on the other side.

18. A toaster as defined in claim 16; operating means and driving means therefor, retracting and releasing all of said supports in sequence, feeding slices to the toasting section and releasing the toasted slices for discharge from the toasting section.

19. A toaster as defined in claim 16; a second toasting section located below and frontally of said first named toasting section forming a passage for slices of bread to the second toasting section; said second toasting section being oppositely disposed and being a complete duplicate of said first named toasting section, for toasting the slices on the other side; operating means and driving means therefor, retracting and releasing all of said supports in sequence, feeding slices of bread to the first named toasting section for toasting on one side followed by discharge to the second toasting section for toasting on the other side.

20. A toaster as defined in claim 7; a second heating unit mounted in spaced relation to said first-named heating unit and forming a space between the heating units for reception of slices of bread selectively, for toasting a slice on both sides.

KENNETH E. BEMIS.